United States Patent [19]
Davis

[11] Patent Number: 5,238,208
[45] Date of Patent: Aug. 24, 1993

[54] LOAD MITIGATION SYSTEM FOR A MULTI-DIMENSIONAL TRANSDUCER ARRAY

[75] Inventor: James M. Davis, Caddo Mills, Tex.

[73] Assignee: E-Systems, Inc., Dallas, Tex.

[21] Appl. No.: 713,092

[22] Filed: Jun. 11, 1991

[51] Int. Cl.⁵ .................................................. B64C 1/36
[52] U.S. Cl. ............................... 244/118.1; 244/137.4; 244/75 A; 244/1 R; 343/705
[58] Field of Search ................. 244/118.1, 1 R, 82, 244/75 A, 137.4, 135 R, 129.1; 343/705; 73/188

[56] References Cited

U.S. PATENT DOCUMENTS

| | | | |
|---|---|---|---|
| 2,586,043 | 2/1952 | Hodgson et al. | 244/75 A |
| 2,936,617 | 5/1960 | Beebe . | |
| 2,955,787 | 10/1960 | Ray et al. | 244/135 R |
| 2,984,834 | 5/1961 | Howard et al. | 343/705 |
| 3,077,773 | 2/1963 | Gardner et al. . | |
| 3,149,800 | 9/1964 | Sintes et al. | 244/135 R |
| 3,475,958 | 11/1969 | Sabadishin et al. . | |
| 3,604,259 | 9/1971 | Heinsohn . | |
| 3,624,833 | 11/1971 | Ricard . | |
| 3,656,164 | 4/1976 | Rempt | 343/705 |
| 4,184,149 | 1/1980 | Baker et al. . | |
| 4,230,290 | 10/1980 | Townsend et al. . | |
| 4,343,447 | 8/1982 | Reed, III | 244/118.1 |
| 4,502,652 | 3/1985 | Breitbach | 244/75 A |
| 4,509,709 | 4/1985 | Utton et al. | 244/118.1 |
| 4,597,287 | 7/1986 | Thomas . | |
| 4,616,793 | 10/1986 | Hassler, Jr. | 244/118.1 |
| 4,804,154 | 2/1989 | Davis | 343/705 |

*Primary Examiner*—Galen Barefoot
*Attorney, Agent, or Firm*—Harold E. Meier

[57] ABSTRACT

A streamlined housing for supporting a multi-dimensional electromagnetic transducer array is attached to an aircraft fuselage via a pivot support. The streamlined housing is supported by the pivot support in a torsionally unrestrained manner allowing a plane containing the longitudinal axis and pivot axis of the housing to remain substantially parallel to the plane of an incident airstream. Static aeroelastic stability is provided by mounting to the aft portion of the streamlined housing one or more rigidly attached stabilizer fins. Dynamic aeroelastic stability is provided by incorporating within the streamlined housing an adjustable ballast weight.

14 Claims, 2 Drawing Sheets

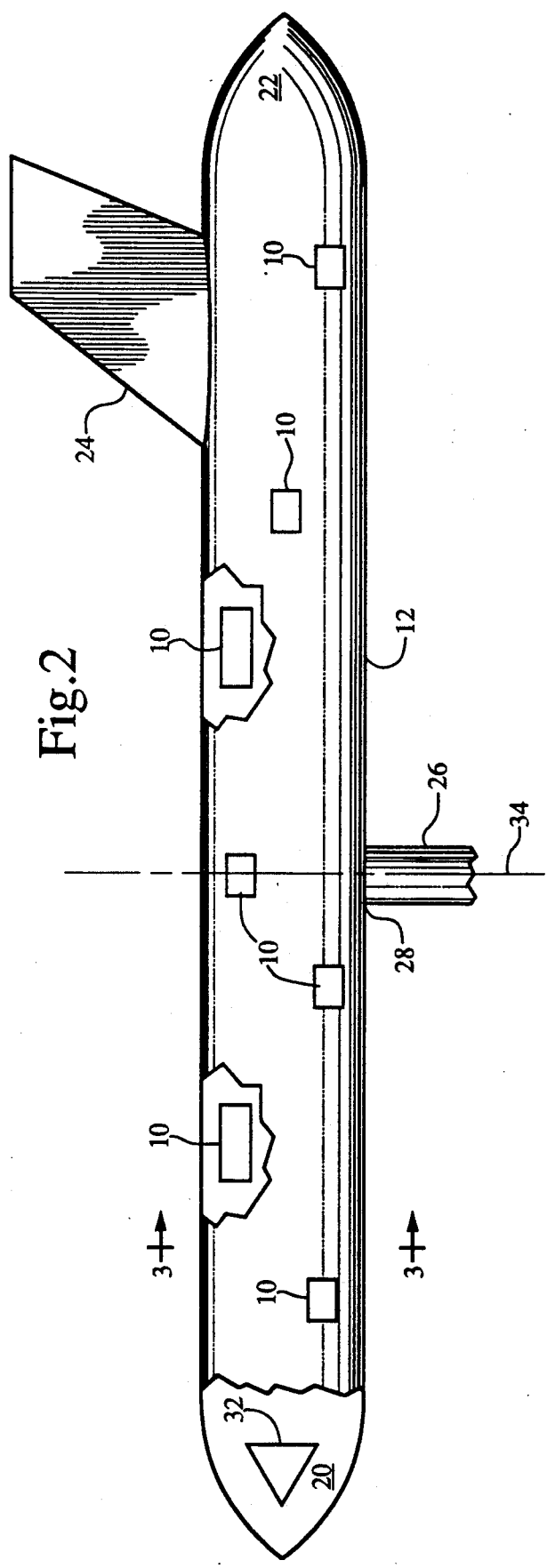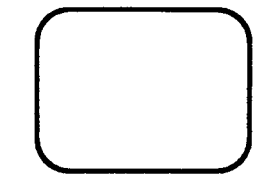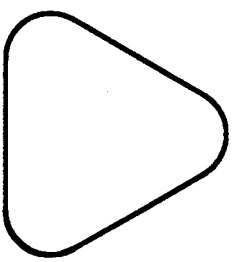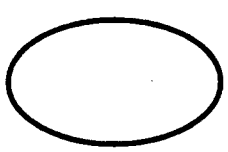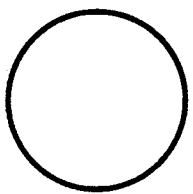

LOAD MITIGATION SYSTEM FOR A MULTI-DIMENSIONAL TRANSDUCER ARRAY

TECHNICAL FIELD

The present invention relates to an apparatus for installing an array of electromagnetic transducers on an aircraft and more particularly to a housing for supporting a multi-dimensional transducer array designed to substantially reduce aerodynamic loads on the configuration, while maintaining static and dynamic stability of the configuration.

BACKGROUND OF THE INVENTION

It is known in the prior art to house electromagnetic aircraft transducers in an aerodynamically-shaped surface or housing on the outside of the aircraft. The prior art discloses support configurations having an aerodynamic housing rigidly attached to the aircraft. Attachment in this manner precludes relative motion between the aircraft and the housing. Thus, the housing moves through the incident airstream in the same manner as the aircraft to which it is attached. During portions of the aircraft flight envelope, sizeable airloads normal to the plane of the surface of the aircraft and housing are encountered when the aircraft angle of attack or sideslip and the plane of the incident airstream differ.

Further developments in the prior art have resulted in mounting configurations for housings in which the aircraft and the housing structurally interface in a torsionally unrestrained manner in at least one rotational degree of freedom about a pivot axis. Attachment of the housing in this manner permits alignment of the housing in a manner parallel to the incident airstream reducing the airload and effectively dynamically decoupling the housing from the host aircraft in that degree of freedom. However, decoupled housings of the type disclosed in the prior art may only support a two-dimensional transducer array.

Accordingly, there is a need for an improved apparatus for externally installing and supporting a multi-dimensional transducer array without subjecting the array to static and dynamic aeroelastic instability.

SUMMARY OF THE INVENTION

According to the present invention, a passive aerodynamic load mitigation system is provided for supporting a multi-dimensional electromagnetic transducer array on an aircraft moving through a fluid stream. In a preferred embodiment, an aerodynamically streamlined three-dimensional housing is used to support the three-dimensional electromagnetic transducer array. The streamlined housing has a nose portion, a tail portion and a body portion. A pivot axis, having a first end attached to the streamlined housing and a second end attached to the aircraft, is configured to enable the housing to rotate in a torsionally unrestrained manner about the pivot axis. Accordingly, a plane containing the longitudinal axis of the streamlined housing and the pivot axis remains substantially parallel to the plane of the incident airstream as the aircraft moves through the fluid stream. Dynamic and static aeroelastic instability is minimized or substantially reduced by adjusting the mass of a ballast weight positioned within the nose section of the streamlined housing and by incorporating one or more stabilizer fins mounted to the exterior of the body portion of the housing.

BRIEF DESCRIPTION OF THE DRAWINGS

A complete understanding of the invention may be had by reference to the following Detailed Description when taken in conjunction with the accompanying Drawings wherein:

FIG. 2 is a side view of the load mitigation system for a multi-dimensional transducer array of FIG. 1 in which certain parts have been cut away to more clearly illustrate certain features of the present invention; and FIGS. 3A–3D show alternative embodiments for the cross-sectional shape of the body portion of the load mitigation system for a multi-dimensional transducer array of the present invention.

DETAILED DESCRIPTION OF THE DRAWINGS

Figure 1:
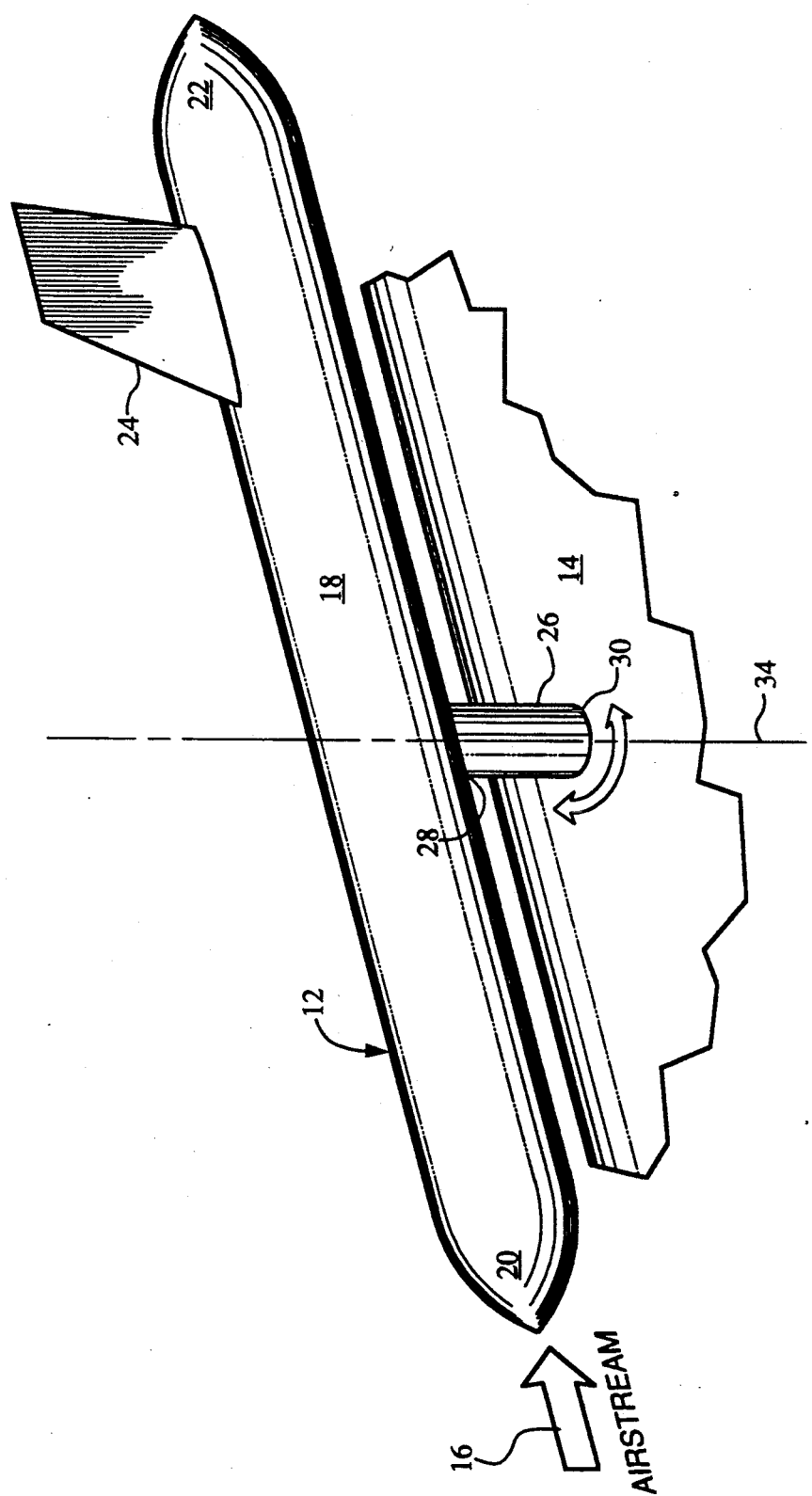
FIG. 1 is a perspective view showing a preferred embodiment of the load mitigation system for a multi-dimensional transducer array of the present invention attached to a portion of a host aircraft.

Referring now to the drawings, wherein like reference characters designate like or corresponding parts throughout the several views, FIG. 1 is a perspective view of one embodiment of the load mitigation system for a multi-dimensional transducer array of the present invention. The load mitigation system is designed to support the sensor elements of a three-dimensional external electromagnetic transducer array 10 housed in or on an aerodynamically streamlined housing 12 attached to an aircraft fuselage 14 in a manner to be described. The housing 12 and fuselage 14 move through an incident airstream 16.

Referring now to FIGS. 1 and 2, the streamlined housing 12 includes a hollow, substantially tubular, body portion 18 and a substantially conical nose and tail portion, 20 and 22 respectively. The nose portion 20 and tail portion 22 are joined to the opposed ends of the body portion 18 to ensure that the housing 12 is aerodynamically-streamlined. The housing 12 further includes one or more stabilizer fins 24 mounted to the outer surface of the streamlined housing.

The streamlined housing 12 is designed to dynamically align with the airstream 16 such that a plane containing the longitudinal axis of the housing 12 and its pivot axis 34 is aligned parallel to the plane of the incident airstream 16 through use of a pivot support 26 that rotatably supports the housing 12 on the aircraft fuselage 14. The pivot support 26 includes a first end 28 connected to the housing 12 and a second end 30 attached to the aircraft fuselage 14. As can be seen in FIGS. 1 and 2, the pivot axis 34 defined by pivot support 26 is located between the opposed longitudinal ends of the housing 12.

Although not shown in detail, it should be appreciated that the first end 28 of the pivot support 26 is connected to the housing 12 via any suitable low friction bearing mechanism. Such a mechanism allows the housing 12 to freely pivot about the Z—Z rotational pivot axis 34 shown in FIGS. 1 and 2. It should also be appreciated that the first end 28 of the pivot support 26 may, alternatively, be permanently secured to the housing 12 in which case the second end 30 of the pivot support 26 would be rotatably-secured to the aircraft fuselage 14 by means of the low friction bearing mechanism.

Unrestrained rotation of the streamlined housing 12 about the Z—Z rotational pivot axis 34 allows a plane containing the longitudinal axis of the housing 13 and pivot axis 34 to align itself parallel to the plane of the incident airstream 16 regardless of the orientation of the aircraft fuselage 14 relative to the airstream. Orientation in this manner passively mitigates airload components normal to this plane that would otherwise adversely affect the in-flight stability of the host aircraft.

Previous techniques for attaching two-dimensional aerodynamic housings to aircraft have avoided the danger of static aeroelastic instability by selectively choosing the location of the rotational pivot axis 34. Static aeroelastic stability is maintained by locating the rotational axis upstream from the location of the aerodynamic center of the two-dimensional housing. In general, an ellipsoidal body, similar to the streamlined housing 12 used in the present invention for supporting a multi-dimensional transducer array, cannot be statically stabilized by upstream positioning of the pivot support 26. According to the present invention, static aeroelastic instability of the torsionally unrestrained housing 12 is minimized by the addition of one or more rigidly attached stabilizer fins 24 mounted to the aft part of the body section 18. The size, location and number of the stabilizer fins 24 to be mounted to the housing 12 is determined by application of contemporary aerodynamic theory and verified by wind tunnel testing.

According to another feature of the present invention, dynamic aeroelastic instability (flutter) is suppressed by the addition of an adjustable ballast weight 32 positioned within the nose portion 20 of the housing 12. Flutter is typically caused by an energy transfer from the incident airstream to the structure and is manifested by violent oscillatory motion of the aircraft structure usually terminating in catastrophic structural failure. Flutter is a self-excited instability involving aerodynamic coupling between two or more modes of motion of the system. Incorporation of an adjustable ballast weight 32 within the nose portion 20 substantially reduces flutter by suppressing self-excited aeroelastic system instability. A ballast weight 32 having a proper inertial value and geometric location within the housing 12 suppresses aeroelastic instability through dynamic inertial cross-coupling between two or more modes of motion of the system.

The amount of ballast required is determined by mathematical analysis of the dynamic interaction of the body-fin aerodynamics, the distributed body-fin inertial parameters and structural stiffness, the pivot support stiffness and the ballast inertial parameters. Sizing of the ballast generally involves a trial and error process followed by system aeroelastic instability analysis. The object of the trial and error process is to achieve aeroelastic stability throughout the flight envelope of the host aircraft using the minimum amount of ballast weight.

The load mitigation system for a multi-dimensional transducer array of the present invention advantageously supports either a two- or three-dimensional electromagnetic transducer array on an aircraft or other structure in an aerodynamically stable fashion. This operation is achieved by using a streamlined housing torsionally unrestrained about its z—z rotational axis to allow a plane containing the longitudinal axis and pivot axis of the housing to orient itself parallel to the plane of the incident airstream. Moreover, static aeroelastic stability of the housing is maintained by mounting to the aft part of the body portion of the housing one or more rigidly attached stabilizer fins. Dynamic aeroelastic instability (flutter) is then suppressed by incorporating within the nose portion of the housing an adjustable ballast weight. It should be appreciated that the basic operating principals of the load mitigation system for a multi-dimensional transducer array of the present invention may also be used to support any type of transducer array on a streamlined three-dimensional body having, for example, a tubular cross-section of the type shown in FIGS. 3A–3D.

Although the invention has been described and illustrated in detail, it is to be understood that the same is by way of illustration and example only and is not to be taken by way of limitation.

What is claimed is:

1. An aerodynamic structure for supporting a plurality of transducers arranged in a three-dimensional array while mitigating aerodynamic impact and structural load on a host structure comprising:
   a three-dimensional aerodynamically streamlined housing for supporting a plurality of transducers arranged in a three-dimensional array, said housing having a nose portion, a body portion and a tail portion shaped to effectively contain said three-dimensional array;
   at least one rigidly attached stabilizer fin mounted to the tail portion of the housing for inhibiting dynamic aeroelastic instability; and
   an adjustable ballast weight positioned within the nose portion of the housing for inhibiting dynamic aeroelastic instability; and
   means for rotatably mounting in a torsionally unrestrained manner the aerodynamically streamlined housing to the host structure comprising a pivot means having a first end mounted to the housing at the body portion and a second end mounted to the host structure.

2. The aerodynamic structure as in claim 1 wherein the nose and tail portions have an aerodynamically streamlined shape and the body portion has a substantially tubular shape.

3. The aerodynamic structure as in claim 1 wherein the body portion has a substantially cylindrical shape.

4. The aerodynamic structure as in claim 1 wherein the body portion has a substantially ellipsoidal shape.

5. The aerodynamic structure as in claim 1 wherein the means for rotatably mounting allows the streamlined housing to pivot in a torsionally unrestrained manner for orientation in a plane containing the longitudinal axis of said housing and pivot axis substantially parallel with an incident airstream.

6. An aerodynamic load mitigation system for supporting a plurality of transducers arranged in a three-dimensional array on a host structure comprising:
   a housing for supporting a plurality of transducers arranged in a three-dimensional array, said housing having a nose portion, a body portion, and a tail portion shaped to effectively contain said three-dimensional array;
   a pivot mechanism having a first end attached to the host structure and rotatably attached at a second end to the body portion of the housing to mount the housing in a torsionally unrestrained manner, said pivot mechanism having a pivotal axis located between the opposed longitudinal ends of the housing;
   means for mitigating the aerodynamic impact and structural load on the host structure; and a plurality of transducers arranged in a three-dimensional array mounted to and supported by said housing.

7. The aerodynamic load mitigation system as in claim 6 wherein said means for mitigating comprises:
means for providing static aeroelastic stability; and
means for providing dynamic aeroelastic stability.

8. The aerodynamic load mitigation system as in claim 7 wherein said means for providing static aeroelastic stability comprises one or more rigidly attached stabilizer fins mounted on an aft portion of the housing.

9. The aerodynamic load mitigation system as in claim 7 wherein said means for providing dynamic aeroelastic stability comprises an adjustable ballast weight positioned within the nose portion of the housing to suppress self-excited aeroelastic instability through inertial cross-coupling.

10. The aerodynamic load mitigation system as in claim 6 wherein said means for mitigating aerodynamic impact and structural load on the host aircraft comprises one or more fins mounted to an aft portion of the housing and a ballast weight mounted within a nose portion of the housing, said ballast weight having a predetermined inertial value to provide system dynamic inertial balancing.

11. An aerodynamic structure for supporting a plurality of transducers arranged in a three-dimensional array while mitigating aerodynamic effects on a host aircraft comprising:
a three-dimensional housing for supporting the plurality of transducers arranged in a three-dimensional array, said housing having a nose portion, a body portion and a tail portion shaped to effectively contain said three-dimensional array;
means attached to the tail portion of the housing for providing static aeroelastic stability comprising one or more stabilizer fins attached to the housing;
means mounted within the nose portion of the housing for suppressing self-excited aeroelastic instability through cross-coupling to provide dynamic aeroelastic stability comprising an adjustable ballast weight; and
a pivot mechanism for rotatably mounting the housing in a torsionally unrestrained manner to the host aircraft having a first end mounted to the housing at the body portion and a second end mounted to the host aircraft.

12. The aerodynamic structure as in claim 11 wherein said housing comprises a hollow, substantially tubular center portion having two substantially conical end portions attached to the opposed ends of said center portion.

13. The aerodynamic structure as in claim 11 wherein said adjustable ballast weight has a predetermined mass and location within the housing to effect dynamic inertial cross-coupling between system nodes.

14. The aerodynamic structure as in claim 11 wherein said pivot mechanism allows a plane containing the longitudinal axis and pivot axis of the housing to substantially align itself parallel to the plane of an incident airstream.

* * * * *